United States Patent [19]

Pope

[11] Patent Number: 4,576,388
[45] Date of Patent: Mar. 18, 1986

[54] RECEPTACLE SUPPORT

[76] Inventor: Douglas R. Pope, 146 Warren Rd., Modbury North, South Australia, Australia, 5092

[21] Appl. No.: 606,833
[22] PCT Filed: Aug. 24, 1983
[86] PCT No.: PCT/AU83/00115
§ 371 Date: Apr. 24, 1984
§ 102(e) Date: Apr. 24, 1984
[87] PCT Pub. No.: WO84/00940
PCT Pub. Date: Mar. 15, 1984

[30] Foreign Application Priority Data

Aug. 24, 1982 [AU] Australia ................ PF5540

[51] Int. Cl.⁴ .................................. B65B 67/04
[52] U.S. Cl. .................. 280/33.99 F; 248/100
[58] Field of Search ............... 248/98, 100; 280/33.99 A, 33.99 F, 47.35; 186/27

[56] References Cited

U.S. PATENT DOCUMENTS

| 1,005,956 | 10/1911 | Gibbins | 248/100 X |
| 1,679,450 | 8/1928 | Thompson | 248/100 |
| 1,699,188 | 1/1929 | Granberg | 248/100 |
| 2,235,182 | 3/1941 | Weston | 248/100 |
| 2,451,829 | 10/1948 | Hightower | 248/100 |
| 2,648,512 | 8/1953 | Scholin | 248/100 |
| 3,041,026 | 6/1962 | Wilson | 280/654 X |

FOREIGN PATENT DOCUMENTS 1317995 5/1973 United Kingdom .

Primary Examiner—Joseph F. Peters, Jr.
Assistant Examiner—Michael Mar
Attorney, Agent, or Firm—Pearne, Gordon, Sessions, McCoy, Granger & Tilberry

[57] ABSTRACT

A receptacle support system to allow receptacles such as bags to be loaded with articles. The system, in one preferred form, may be incorporated in a supermarket trolley (1) and essentially comprises an upper frame (7) carrying opposing pairs of hooks (13, 14). The hooks (14) are fixed to the frame while the hooks (13) are movable relative to the frame, so that when a bag is hooked over the respective pairs of opposing hooks, movement of the hooks (13) away from hooks (14) by handle (12) causes the bag mouth to be opened. To close the bag, hooks (13) are moved in the opposite direction by handle (15). The system may be incorporated in supermarket checkouts or any other application where it is necessary for bags to be held open while being loaded.

11 Claims, 7 Drawing Figures

RECEPTACLE SUPPORT

This invention relates to a receptacle support system and more particularly to a support system which will allow receptacles such as bags to be loaded with articles.

In a supermarket and many other types of shops it is conventional to provide shoppers with some form of receptacle in which to take home their purchased goods. It has been conventional to supply large paper bags for such purposes but with the cost of paper increasing it is more economical to supply lightweight plastic bags such as polyethylene or polypropylene bags in which customers may take home their purchases.

Plastic bags however do not stay open during loading as paper bags can and hence plastic bags are often difficult and awkward to load. This greatly reduces customer acceptance of such receptacles.

There have been proposed receptacle supports which consist of a series of fixed protuberances adapted to support a plastic bag by gripping handles or upper edges of the bag and holding the bag open. These have the disadvantage however that while holding the bag open for filling, when the bag is full the plastic material is stretched tightly and it is difficult to remove the bag by removing the handles or the like from the protuberances.

It is an object of this invention to provide support means for such receptacles which will enable the loading of these receptacles and to facilitate the removal of such receptacles once they have been loaded.

In one form therefore, the invention is said to reside in an article loading arrangement including means to engage with and spread the handles of a non rigid handled container to open the container, to allow for the loading of the container and means to close the handles to substantially close the container, so that the container may be removed from the loading arrangement.

In an alternative form, the invention may be said to reside in a supermarket trolley of a type including a handle, wheels and article support shelf and an upper frame, the trolley being characterised by a plurality of hooks, the hooks being arranged on the upper frame, in pairs on opposite sides and situated above the shelf, a first one of each of the pairs of hooks being adapted to be moved away from the second of each of the pairs of hooks from a first position to a second position, means to retain the first hooks in the second position and means to release the first hooks from their second position and to return them to their first position.

In a further alternative form the invention may be said to reside in a loading station of a type including a shelf to support at least one container to be loaded and an upper frame including hooks adapted to engage spaced apart upper portions of a container in use, the loading station being characterised by the hooks being arranged in pairs on the frame, with one pair to each side of the shelf, adapted to engage with the upper edge of the container as aforesaid and a first pair of each of the pairs of hooks being movable relative to the second of the pair of hooks such that a container when engaged by the hooks, may be opened for loading when the first of the hooks is moved from a first position to a second position away from the second of the hooks.

In a preferred form of the invention, the second hooks may be affixed to the frame and the first pair of hooks movable relative to the frame.

In an alternative preferred form, the loading station may further include means to retain the hooks in the second position and means to release the hooks from the second position.

The loading station may further include a plurality of pairs of hooks on each side of the shelf and an activating rod associated with the frame on each side of the shelf, each of the first hooks being connected to its respective activating rod such that by longitudinal movement of the activating rods each of the first hooks is moved with respect to the second hooks. There may be included resilient means acting on the first hooks to return the hooks from the second position to the first position.

The hooks may be adapted to attach to handles at the upper edge of the container in use or may have other gripping means to grip a container of a type which does not have handles on its upper edge.

In one preferred form the loading station is particularly adapted for loading plastics bags having a pair of handles spaced apart on its upper edge, with one pair of the hooks acting into one each of the handles so that as the pairs of hooks are moved apart with respect to the other of the pair, the handles are stretched which opens the container for loading.

In one preferred form the loading station may comprises a supermarket trolley.

In a further preferred form the loading station may be mounted at a supermarket checkout and be a fixture into which a checkout operator can place goods as their price is recorded.

It will be seen that by this invention there is provided a device which can be loaded with plastic bags by hooking their handles or other convenient upper portions of the bags onto the necessary hooks, then the hooks may be spread to open the bag for loading and once loading is completed the hooks may then be moved together again, which will enable the handles to be gripped and removed from the hooks.

In one preferred form, where the hooks are adapted to grip handles on a plastics bag, it has been found that upon moving the hooks together after loading, the handles are actually projected upward which facilitates removal of the container from the receptacle support shelf.

To more clearly understand the invention, however reference will be made to the accompanying illustrations which show one embodiment of the invention with the invention embodied on a supermarket trolley, but it is to be stressed that the invention is not restricted to application on a supermarket trolley and as indicated above the receptacle support may be mounted or placed in any other position where articles are loaded. An example of this would be for instance in a fruit packing shed where bags are to be packed with fruit or vegetables and it is desired to hold such bags open while they are being loaded. In such an instance the term hooks may be broadly interpreted to include such things as vacuum suction heads or grippers which may grip the bag to open the bag to facilitate loading.

Now looking at the drawings in general:

Figure 1:
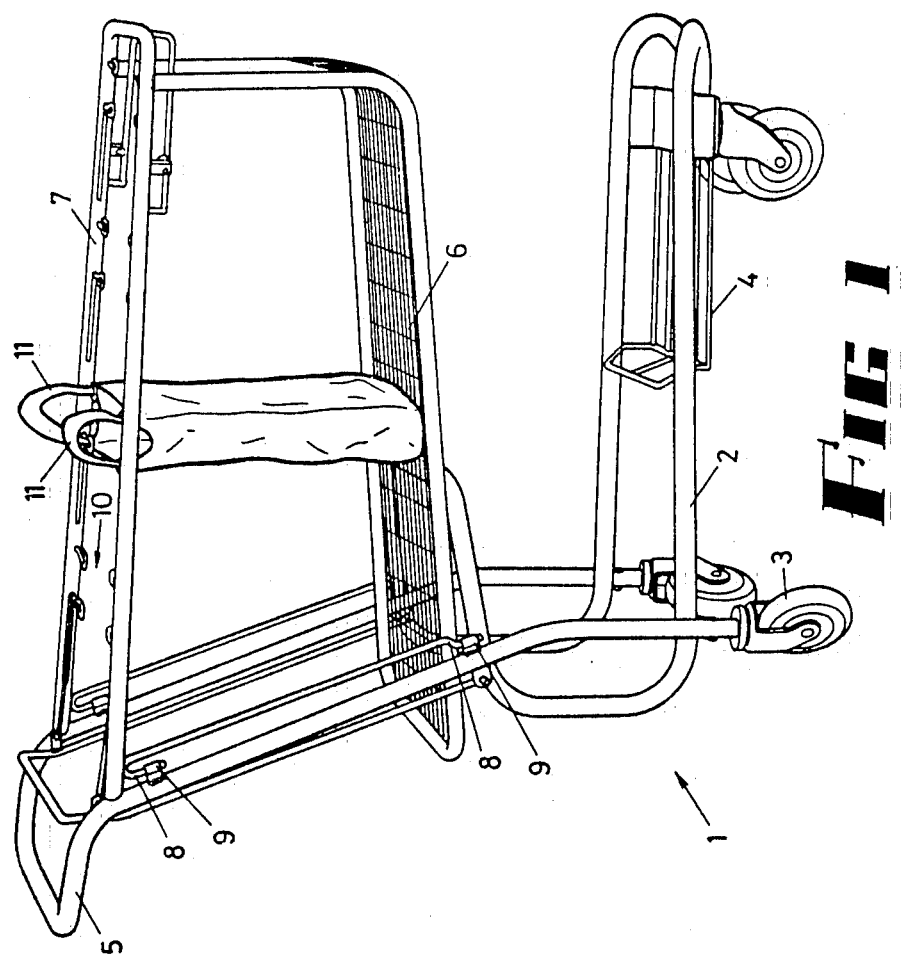
FIG. 1 shows a supermarket trolley with the hooks in the closed position and a bag placed on one of the pairs of pairs of hooks.

Now looking more closely at the drawings, it will be seen that the supermarket trolley 1, comprises a lower frame 2 having wheels 3 and a large-article support shelf 4.

A handle 5 is provided to enable propulsion of the supermarket trolley. A main shelf 6 is provided mid way up the trolley and an upper frame 7 surrounds the shelf but at a higher level.

In this particular embodiment the main shelf 6 and upper frame 7 are a single piece which may be removed from or placed onto the main frame of the supermarket trolley and connects in by means of plugs 8 fitting into sockets 9. This particular construction is mainly provided to facilitate manufacture of the supermarket trolleys.

Along the upper frame 7 of the trolley are provided a series of hooks generally shown as 10 into which the handles of a bag may be placed. As shown in FIG. 1, when the bag is empty the handles 11 may be hooked over a pair of the hooks with the bag hanging down between the sides of the frame 7 and reaching down to the main shelf 6.

Figure 2:
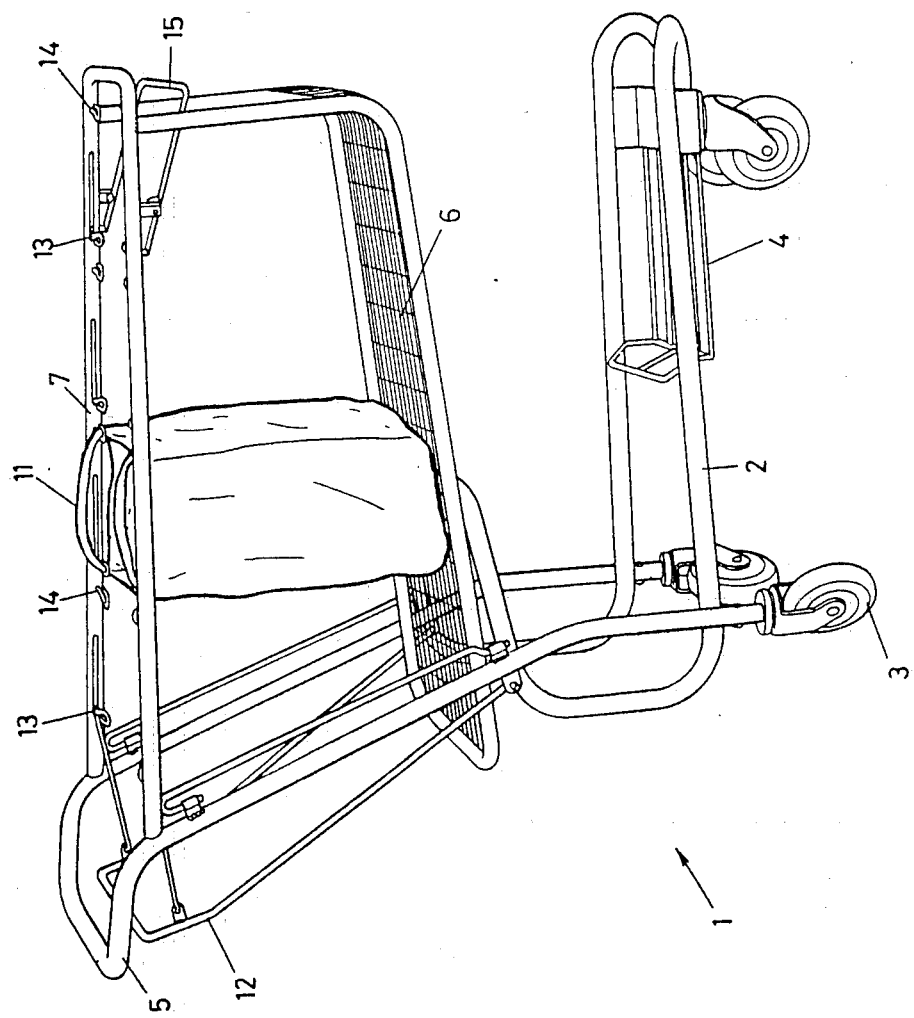
FIG. 2 shows a supermarket trolley with the hooks in the opened position with the bag stretched open.

Now as shown in FIG. 2, when the actuating handle 12 is pulled away from the supermarket trolley the first hooks 13 are moved away from the second hooks 14 such that the handles 11 of the bag are stretched, which will open the top of the bag to allow loading.

When it is desired to close the bags, the release lever 15 is actuated which allows the first hooks 13 to move back to their position adjacent to the second hooks 14 which will push the handles up to their position as shown in FIG. 1 but with perhaps the bag more fully laden and hence the handles may be easily unhooked from the hooks for removal of the bag.

Figure 3:
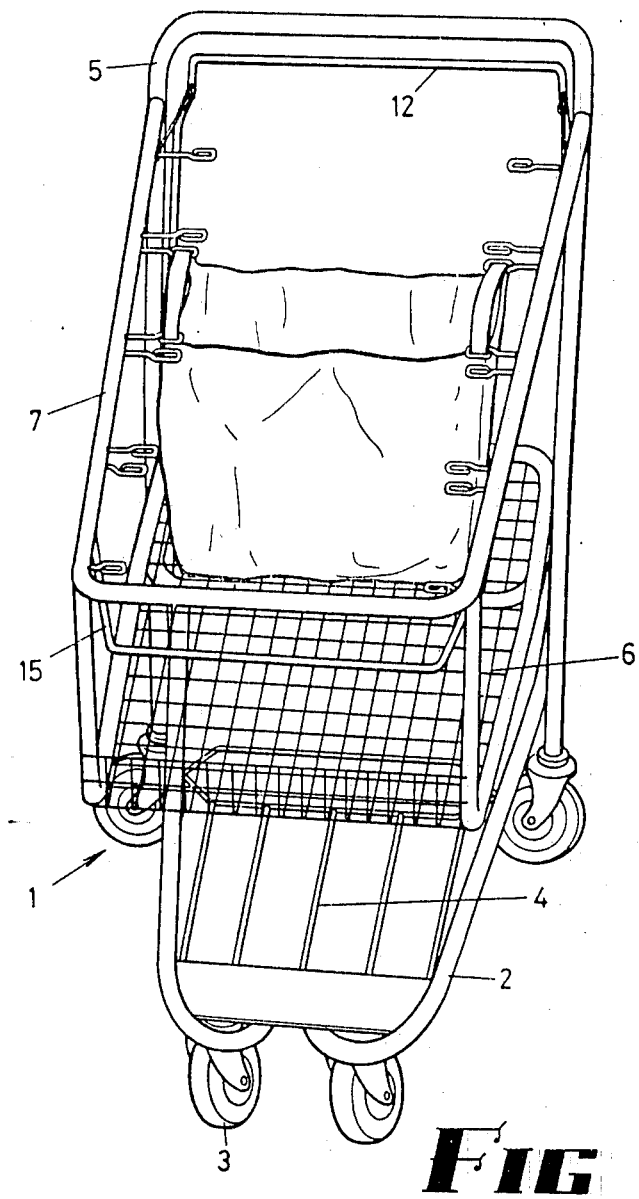
FIG. 3 shows an end on view of the supermarket trolley with the hooks in the opened position with the bag open.

FIG. 3 shows an end on view of the supermarket trolley with a bag supported on one of the pair of the hooks with the hooks in the opened position so that the bag is opened for insertion of receptacles In this view it will be seen that the supermarket trolley has the spacing of its upper frame tapered so that the trolleys may nest easily when they are being stored and to facilitate attachment of the bags it will be seen that the hooks at the handle end of the upper frame protrude further from the upper frame than those remote from the handle.

Figure 4:
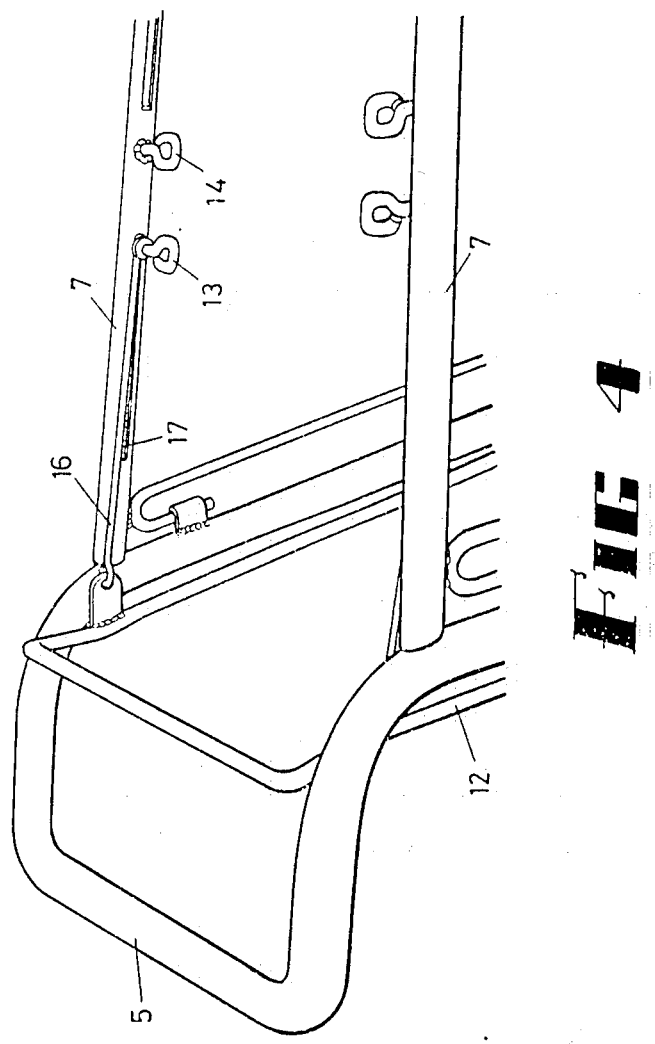
FIGS. 4 and 5 show the operation of the device for opening the hooks.
Figure 5:
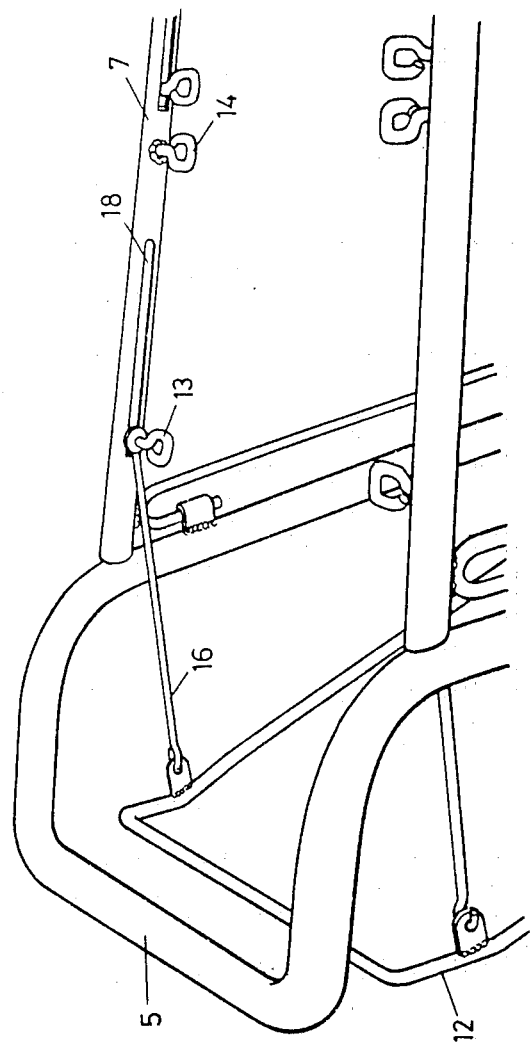
Figure 6:
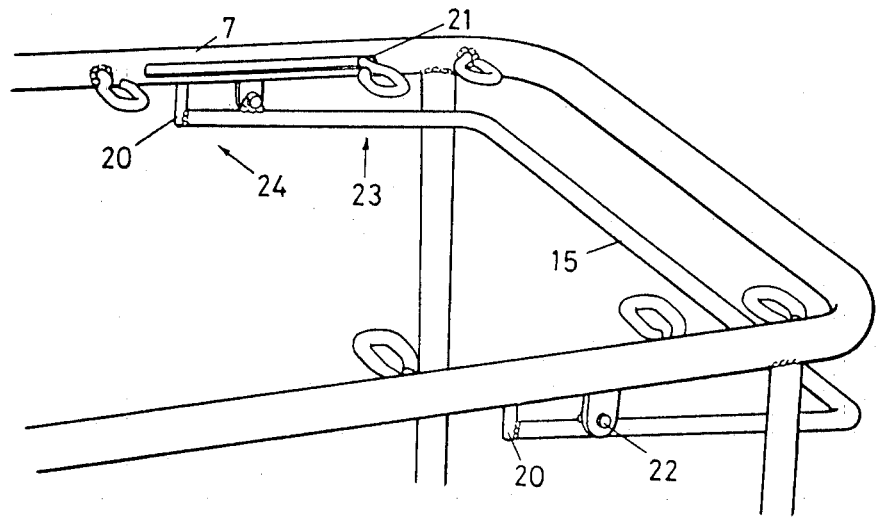
FIGS. 6 and 7 show the mechanism by which the hooks are maintained apart and released to be closed.
Figure 7:
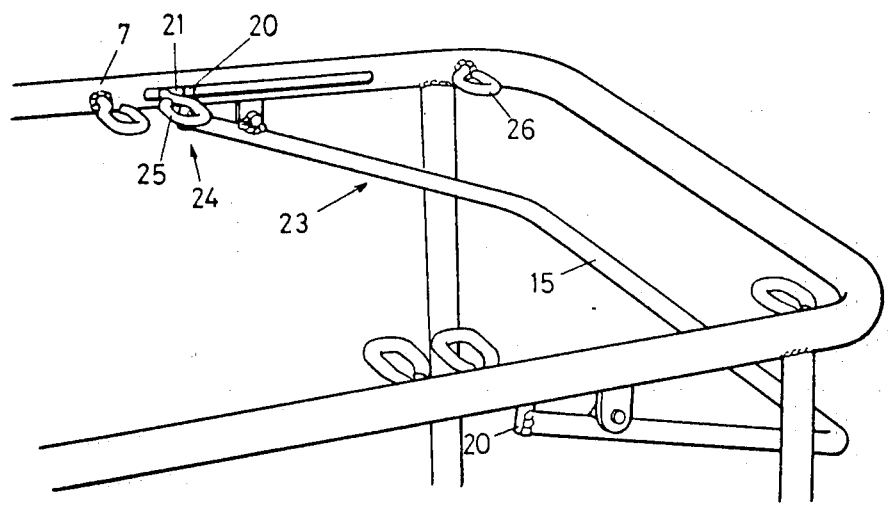

Now looking at FIGS. 4 and 5 which show the activating arm mechanism in more detail, it will be seen that the activating arm 12 is connected to the first of the first pair of hooks by a link rod 16. Within each side of the upper frame 7, an activating rod is adapted to slide back and forth and into this activating rod is fastened each of the first hooks of each pair. A spring 17, biases the activating rod so that the hook 13 is close to the hook 14, when the actuating arm 12 is moved towards the handle 5, the hook 13 is moved away from the hook 14 until it is at the opposite end of the slot 18 in the side frame 7 and the spring 17 is compressed.

The actuating rod within the frame member 7 is retained in the position as shown in FIG. 5 by means of pins 20 which pass through holes in the underneath of the frame 7 and catch behind the end of the activating rod 21. It will be seen that the release lever 15 is attached to the pins 20 and pivots about the axis point 22. The release lever 15 is so constructed that it is of greater mass on the side 23 than the side 24 so that gravitational force acting on the side 23 will cause the pin 20 to pass in behind the actuating rod 21 when the hook 25 is moved to its position furthest remote from the hook 26.

To release the bags once loading has been completed the release lever 15 is lifted, which removes the pin 20 from the behind the end 21 of the actuating rod and the resilient spring 17 then pushes the actuating rod so that the hooks 13 are once again adjacent the hooks 14 and respectfully the hooks 25 are once again adjacent the hook 26.

It will be realised that other mechanisms may be provided by which the hooks may be moved apart, retained in the moved apart position and then returned to their original position.

It should be noted that although the supermarket trolley is depicted having four pairs of hooks on each side of the frame so that four bags may be supported, it will be realised that any other number of bags is within the scope of this invention.

I claim:

1. A supermarket trolley of the type including a handle, wheels, an article support shelf and an upper frame, the trolley being characterised by a plurality of loop hooks adapted to engage with and support handles of a non-rigid handled container having an open top, said handles being located near the open top of the container for opening and closing the same, the hooks being arranged on the upper frame in pairs on opposite sides of and situated above the shelf, a first one of each of the pairs of hooks being movable from a first position to a second position relative to a second one of each of the pairs of hooks such that a container engaged by the hooks is opened when said first hooks are in said second position and is closed when said first hooks are in said first position, resilient means for biasing and moving said first hooks from said second position to said first position, actuating means for moving said first hooks to said second position and means for releasably retaining the first hooks in said second position whereby empty containers can be put in the trolley and engaged with said hooks with the container handles in an unstretched condition when said hooks are in said first position and then held open for loading by moving said first hooks to said second position, and loaded containers are closed by releasing said retaining means and for permitting loaded containers to be easily taken out of the trolley.

2. A supermarket trolley as in claim 1, in which the second hooks are affixed to the frame.

3. A supermarket trolley as in claim 2, including a plurality of pairs of hooks on each side of the shelf and an activating rod associated with the frame on each side of the shelf, each of the first hooks being connected to its respective activating rod such that by longitudinal movement of the actuating rods, each of the first hooks is moved with respect to the second hooks.

4. A supermarket trolley as in claim 3, wherein the hooks are adapted to attach to handles on the upper edge of a container in use.

5. A supermarket trolley according to claim 3, wherein said resilient means biases said activating rods to move longitudinally such that said first hooks are moved to said first position.

6. A supermarket trolley according to claim 5, wherein said retaining means releasably prevents longitudinal movement of said activating rods when said first hooks are in said second position.

7. A supermarket trolley according to claim 6, wherein said retaining means includes a pivoted release lever on the frame which when in a catch position obstructs sliding movement of said activating rods and which when in a release position permits said resilient means to longitudinally move said activating rods and thus move said first hooks to said first position.

8. A supermarket trolley according to claim 7, wherein said release lever automatically moves into said catch position when said activating rods move said first hooks to said second position.

9. A supermarket trolley according to claim 8, wherein said release lever moves to said catch position due to gravitational force on said release lever.

10. A supermarket trolley according to claim 9, wherein said release lever has rigid members which engage one end of each of said activating rods when said release lever is in said catch position, said release lever removing said rigid member or pin from engagement with said activating rod end when in said release position.

11. A supermarket trolley according to claim 10, wherein said activating means is an actuating arm joined with corresponding ends of said activating rods opposite said one ends such that movement of said actuating arm causes longitudinal movement of said activating rods to move said first hooks from said first position to said second position.

* * * * *